US008472355B2

(12) United States Patent
Zhu (10) Patent No.: US 8,472,355 B2
(45) Date of Patent: Jun. 25, 2013

(54) SYSTEM, APPARATUS AND METHODS FOR BROADCASTING AND TRANSMITTING ETWS MESSAGE

(75) Inventor: Zuoyan Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 308 days.

(21) Appl. No.: 12/976,759

(22) Filed: Dec. 22, 2010

(65) Prior Publication Data

US 2011/0090828 A1 Apr. 21, 2011

Related U.S. Application Data

(63) Continuation of application No. PCT/CN2009/072314, filed on Jun. 17, 2009.

(30) Foreign Application Priority Data

Jun. 23, 2008 (CN) .......................... 2008 1 0129086

(51) Int. Cl.
H04M 11/04 (2006.01)
(52) U.S. Cl.
USPC ...................... 370/270; 455/404.1; 713/176
(58) Field of Classification Search
None
See application file for complete search history.

(56) References Cited

U.S. PATENT DOCUMENTS

| 7,312,712 B1 | 12/2007 | Worrall |
| 8,081,587 B2 * | 12/2011 | Beckmann et al. ........... 370/310 |
| 2007/0202886 A1 | 8/2007 | Dhebri et al. |

FOREIGN PATENT DOCUMENTS

| CN | 1404241 A | 3/2003 |
| CN | 1863176 A | 11/2006 |
| CN | 101001407 A | 7/2007 |
| CN | 101557264 B | 5/2011 |
| WO | WO 2009/155834 A1 | 12/2009 |

OTHER PUBLICATIONS

S2-084955, 3GPP TSG SA WG2 Meeting #66, Jun. 18, 2008.*
Office Action issued in corresponding Chinese Patent Application No. 200810129086.2 (including English Translation and Verification of Translation); issued Oct. 28, 2010.
English translated granted claims from corresponding Chinese Patent Application No. 200810129086.2 (including Verification of Translation).
Office Action issued in corresponding Chinese Patent Application No. 200810129086.2, mailed Mar. 11, 2010.

(Continued)

Primary Examiner — Alex Skripnikov
(74) Attorney, Agent, or Firm — Brinks Hofer Gilson & Lione (57) ABSTRACT

The present invention relates to an earthquake and tsunami warning system (ETWS) technology, and in particular to a system, apparatus and methods for broadcasting and transmitting an ETWS message. The system for broadcasting and transmitting an ETWS message includes: an ETWS message publishing entity, adapted to publish an ETWS message; a cell broadcast center (CBC), adapted to: encapsulate the ETWS message published by the ETWS message publication entity into a cell broadcast service (CBS) message, and send the CBS message; a mobility management entity (MME), adapted to forward the CBS message sent by the CBC to a radio access network (RAN); and the RAN, adapted to: receive the CBS message forwarded by the MME, and send the received CBS message to a user equipment (UE). The preceding system provides a new technical solution for transmitting an ETWS message, which can guarantee the security of the ETWS message transmission by using the security mechanism of the CBS.

15 Claims, 8 Drawing Sheets

OTHER PUBLICATIONS

3rd Generation Partnership Project; Technical Specification Group Terminals Specification of the Subscriber Identity Module—Mobile Equipment (SIM-ME) interface (Release 1999). Global System for Mobile Communications, 3GPP TS 11.11, V8.14.0, Jun. 2007.

3rd Generation Partnership Project; Technical Specification Group Services and System Aspects; Study for Requirements for a Public Warning System (PWS) service (Release 8). Global System for Mobile Communications, 3GPP TR 22.968, V8.0.0, Mar. 2008.

3rd Generation Partnership Project; Technical Specification Group Services and System Aspects; Earthquake and Tsunami Warning System (ETWS) requirements; Stage 1 (Release 8). Global System for Mobile Communications, 3GPP TS 22.168, V8.0.0, Mar. 2008.

3rd Generation Partnership Project; Technical Specification Group Radio Access Network; Evolved Universal Terrestrial Radio Access (E-UTRA) Radio Resource Control (RRC); Protocol Specification (Release 8). 3GPP TS 36.331, V8.1.0, Mar. 2008.

3rd Generation Partnership Project; Technical Specification Group Services and System Aspects; General Packet Radio Service (GPRS) Enhancements for Evolved Universal Terrestrial Radio Access Network (E-UTRAN) access (Release 8). 3GPP TS 23.401, V8.1.0, Mar. 2008.

3rd Generation Partnership Project; Technical Specification Group Terminals Specification of the Subscriber Identity Module—Mobile Equipment (SIM—ME) Interface (Release 1999). 3GPP TS 11.11, V8.14.0, Jun. 2007.

Extended European Search Report issued in corresponding European Patent Application No. 09768759.4, mailed Mar. 16, 2011.

Written Opinion of the International Searching Authority issued in corresponding PCT Patent Application No. PCT/CN2009/072314, mailed Sep. 10, 2009.

SA3, "Reply LS to SA2 regarding ETWS Security" 3GPP TSG RAN WG2 Meeting #61bis. Shenzhen, China, Mar. 31-Apr. 4, 2008., R2-081916.

Vodafone, "ETWS for GSM", 3GPP TSG Geran Meeting #37, Seoul, Republic of Korea, Feb. 18-22, 2008. TDoc GP-080142.

Nokia Corporation, Nokia Siemens Networks, "ETWS in E-UTRAN Rel 8", 3GPP TSG-RAN WG2 Meeting #62. Kansas City, USA, May 5-9, 2008. R2-082441.

RAN2, "Reply LS on Earthquake and Tsunami Warning System", 3GPP RAN WG2 Meeting #62. Kansas City, USA, May 5-9, 2008. R2-082883.

GSM, "3rd Generation Partnership Project; Technical Specification Group Services and System Aspects; Earthquake and Tsunami Warning System Requirements and Solutions (ETWS); Solution Placeholder "(Release 8). 3GPP TR 23.828, V1.0.0, Jun. 2008.

GSM, "3rd Generation Partnership Project; Technical Specification Group Services and System Aspects; Earthquake and Tsunami Warning System (ETWS) Requirements; Stage 1" (Release 8), 3GPP TS 22.168, V1.2.1, Jan. 2008.

GSM, "3rd Generation Partnership Project; Technical Specification Group Terminals; Technical Realization of Cell Broadcast Service (CBS)" Release 7. 3GPP TS 23.041, V7.0.0, Mar. 2006.

* cited by examiner

FIG. 10

SYSTEM, APPARATUS AND METHODS FOR BROADCASTING AND TRANSMITTING ETWS MESSAGE

CROSS REFERENCE TO RELATED APPLICATIONS

This application is a continuation of International Patent Application No. PCT/CN2009/072314, file on Jun. 17, 2009, which claims priority to Chinese Patent Application No. 200810129086.2, filed on Jun. 23, 2008, both of which are hereby incorporated by reference in their entireties.

FIELD OF THE INVENTION

The present invention relates to a field of network communication technology, and in particular, to methods, apparatus and system for broadcasting and transmitting an earthquake and tsunami warning system (ETWS) message and a method for receiving an ETWS message, network device and user equipment (UE).

DESCRIPTION OF RELATED ART

A long term evolution (LTE) system needs to support ETWS. That is, the LTE system needs to support the broadcast and transmission of an ETWS message. Thus, the ETWS can send the ETWS message to UEs so as to timely notify users of related information such as instructions on tsunami warning, rescuing facilities and shelters in case of tsunami disasters.

In the prior art, the method for broadcasting and transmitting an ETWS message in the LTE system is as follows: the core network transmits an ETWS message to a radio access network (RAN); after an evolved NodeB (eNB) in the RAN receives the ETWS message, the eNB sends a system information change notification to UEs; and upon reception of the system information change notification, the UE reads new system information according to a location specified in the change notification to obtain the ETWS message. From the RAN, the ETWS message is sent to the UE via system information.

During the implementation of the present invention, the inventors find at least the following weaknesses in the prior art:

If the core network sends the ETWS message to the RAN directly, it is necessary to add a new interface between the core network and the RAN for the delivery of the ETWS message from the core network to the RAN. In addition, the security of the ETWS message is to be considered. Furthermore, there is lack of a solution for the transmission of an ETWS message within the core network.

SUMMARY

Embodiments of the present invention provide a system, apparatus and methods for broadcasting and transmitting an ETWS message. Thereby, a technical solution of the transmission of an ETWS from the core network to an RAN is provided and the security of the ETWS message is guaranteed. Furthermore, a solution of the delivery of the ETWS message within the core network is also provided.

A system for broadcasting and transmitting an ETWS message in an embodiment of the present invention includes: an ETWS message publication entity, adapted to publish an ETWS message; a cell broadcast center (CBC), adapted to encapsulate the ETWS message published by the ETWS message publication entity into a cell broadcast service (CBS) message and send the CBS message; a mobility management entity (MME), adapted to forward the CBS message sent by the CBC to a radio access network (RAN); and the RAN, adapted to receive the CBS message forwarded by the MME and send the received CBS message to a user equipment (UE).

A method for broadcasting and transmitting an ETWS message in an embodiment of the present invention includes: by a CBC, receiving an ETWS message, encapsulating the received ETWS message into a CBS message and sending the CBS message to an RAN.

A network device in an embodiment of the present invention includes: an ETWS message receiving module, adapted to receive an ETWS message; an encapsulation module, adapted to encapsulate the ETWS message received by the ETWS message receiving module into a CBS message; and a sending module, adapted to send the CBS message encapsulated by the encapsulation module to an RAN.

A method for broadcasting and transmitting an ETWS message in an embodiment of the present invention includes: by an RAN, receiving a CBS message containing an ETWS message from a core network and sending the received CBS message to a UE.

An apparatus for broadcasting and transmitting an ETWS message in an embodiment of the present invention is located in an RAN and includes: a CBS message receiving module, adapted to receive a CBS message containing an ETWS message from a core network; and a CBS message sending module, adapted to send the CBS message received by the CBS message receiving module to a UE.

A method for receiving an ETWS message in an embodiment of the present invention includes: receiving, by a UE, a CBS message from an RAN; and decapsulating, by the UE, the CBS message, and obtaining an ETWS message encapsulated in the CBS message.

A user equipment in an embodiment of the present invention includes: a reception module, adapted to receive a CBS message from an RAN; and a decapsulation module, adapted to decapsulate the CBS message received by the reception module, and obtain an ETWS message encapsulated within the CBS message.

According to the description of the preceding technical solutions of the embodiments above, an ETWS message is encapsulated within a CBS message, so that a solution of the delivery of the ETWS message from the core network to the RAN is provided. In addition, the security of the ETWS message transmission is guaranteed by using the security mechanism of the CBS message. Furthermore, solutions about the delivery of the ETWS message within the core network are also provided in embodiments of the present invention.

DETAIL DESCRIPTION OF EMBODIMENTS

The system for broadcasting and transmitting an ETWS message in an embodiment of the present invention includes an ETWS message publication entity, a cell broadcast center (CBC), a mobility management entity (MME), and a radio access network (RAN). The ETWS message publication entity is a reliable network device, and may be a government ETWS center (GEC).

Figure 1:
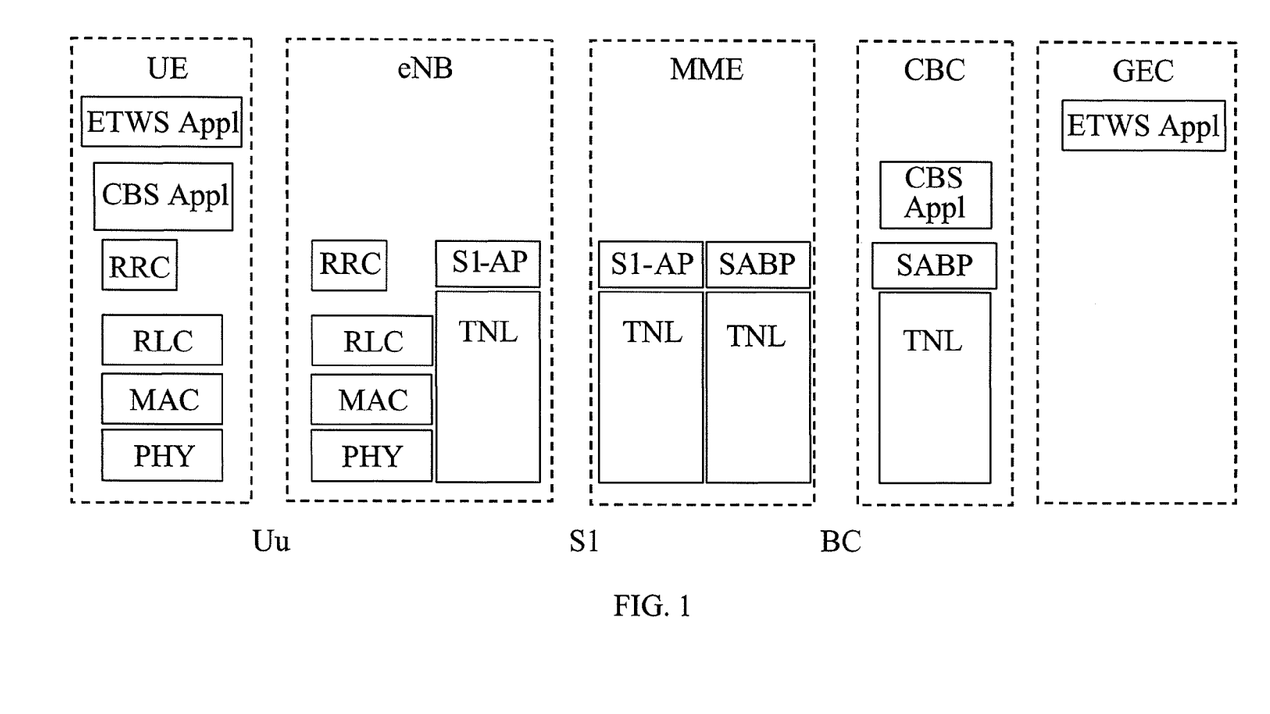
FIG. 1 is a schematic diagram illustrating a system for broadcasting and transmitting an ETWS message in an embodiment of the present invention.

Taking the GEC and the MME as examples, the following describes with reference to FIG. 1 the system for broadcasting and transmitting an ETWS message provided in an embodiment.

In FIG. 1, the GEC includes an ETWS application layer (ETWS Apply. The GEC is adapted to publish an ETWS message, which is further transmitted to the CBC. The ETWS message includes two types of notifications, which are primary notification (PN) with higher priority and secondary notification (SN). The PN is used to notify the UE about emergency information, such as "imminent occurrence of Tsunami, Please go to XXX places". The PN includes few contents, but has a high level requirement for delay. For example, it is required that delay for the PN being delivered from the core network to the UE is four seconds. The SN is used to deliver information after disasters, such as information about where to get rescue materials and where is safe. The SN may include picture instructions. Compared with the PN, the SN includes more information and has a lower delay requirement. For example, the SN requires that the delay from the core network to the UE is 30 seconds.

The GEC may also publish digital signature information of the ETWS, which is used to guarantee the security of the ETWS message. The digital signature information may be the digital signature information of access layer, indicating that the security of the ETWS message may be guaranteed by the access layer, or the digital signature information may also be the digital signature information of application layer, indicating that the security of the ETWS message may be guaranteed by the application layer. The digital signature information published by the GEC may be transmitted to the CBC or to the MME. For example, the digital signature information of access layer may be transmitted transparently to the MME via the CBC, and the digital signature information of the application layer may be transmitted to the CBC.

The CBC shown in FIG. 1 includes a CBS application layer (CBS Appl). The CBC receives the ETWS message from the GEC, encapsulates the ETWS message into a CBS message, and sends the CBS message. If the CBC receives the digital signature information of application layer from the GEC, the CBC may encapsulate both the digital signature information of application layer and the ETWS message into a CBS message. Of course, the CBC may also encapsulate the digital signature information of application layer and the ETWS message into different CBS messages respectively for transmission. In addition, the CBC may encapsulate the digital signature information of application layer into a different type of message other than the CBS message for transmission. If the CBC receives the digital signature information of access layer, the CBC transmits the digital signature information of the access layer to the MME transparently.

The MME shown in FIG. 1 includes an S1 Application Protocol (S1-AP) layer. The MME receives a CBS message within which an EMTS message is encapsulated from the CBC, and forwards the CBS message to the RAN. The MME may forward the CBS message to the RAN via the S1 interface. The S1 interface between the MME and the RAN may be extended for forwarding the CBS message containing ETWS message. If the CBS message containing an ETWS message carries no digital signature information and the MME receives the digital signature information, the MME may send the received digital signature information to the RAN. For example, the MME sends the digital signature information to the RAN via the S1 interface.

The RAN shown in FIG. 1 includes an S1-AP layer. After the RAN receives a CBS message that is encapsulated with an ETWS message and forwarded from the MME (for example, via the S1 interface), the RAN sends the received CBS message to at least one UE. The RAN may send the CBS message to the at least one UE through system information, or via a new common traffic channel or a dedicated traffic channel. Where, the dedicated traffic channel may be an exiting channel for transmitting other services. If the CBS message carries no digital signature information and the RAN receives digital signature information, the RAN may send the CBS message and the received digital signature information together to the UE.

Operations performed by modules of the CBC and RAN and each network entity are described in the following embodiments.

It can be seen from the description of the preceding system in above embodiment, a new technical solution for transmitting an ETWS message is provided. In the technical solution, the ETWS message is encapsulated into a CBS message for transmission, so that the security of the ETWS message transmission can be guaranteed by using the security mechanism of the CBS. Furthermore, by extending the present S1 interface to transmit the CBS message having an ETWS message encapsulated within it, the existing S1 interface in the LTE system can be reused. Therefore, it is unnecessary to add new interfaces for transmitting the ETWS message, thus, the transmission of the ETWS message can be released with very minor changes to the current LTE system protocol. In this embodiment, the security of the ETWS message is further guaranteed by using the digital signature information, which avoids unnecessary social panics caused by false warning messages.

Figure 2:
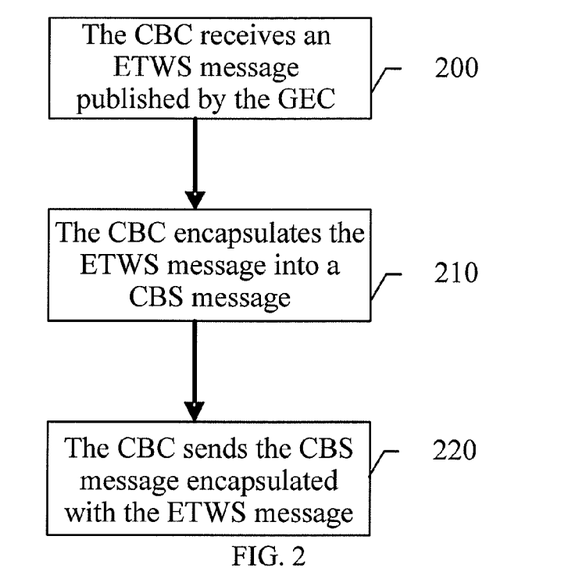
FIG. 2 is a first flowchart of a method for broadcasting and transmitting an ETWS message in an embodiment of the present invention.

The following describes an embodiment of the method for broadcasting and transmitting an ETWS message with reference to FIG. 2.

Step 200: The CBC receives an ETWS message. For example, the CBC receives an ETWS message published by the GEC. In step 200, the CBC may also receive the digital signature information published by the GEC. Then, the process proceeds to step 210.

Step 210: The CBC encapsulates the ETWS message into a CBS message. Then, the process proceeds to step 220.

If the CBC also receives the digital signature information of application layer, the CBC may encapsulate both the ETWS message and the digital signature information of application layer into a same CBS message. In addition, the CBC may encapsulate the digital signature information of application layer and the ETWS message respectively. For example, the CBC encapsulates the digital signature information of application layer into one CBS message and the ETWS message into another CBS message.

Step 220: The CBC sends the CBS message containing the ETWS message. For example, the CBC sends the CBS message containing the ETWS message to the RAN via the MME. The CBS message may include both the ETWS message and the digital signature information. If the CBC processes the digital signature information separately from the ETWS message. For example, if the CBC encapsulates the digital signature information separately, the CBC also needs to send the digital signature information processed separately to the RAN via the MME. For example, the CBC sends a CBS message within which the digital signature information is encapsulated to the RAN via the MME. If the CBC receives the digital signature information of access layer, the CBC may transmit the digital signature information of access layer to the MME transparently.

The method for broadcasting and transmitting an ETWS message as shown in FIG. 2 may be used in LTE system or other systems such as a WCDMA system.

Figure 3:
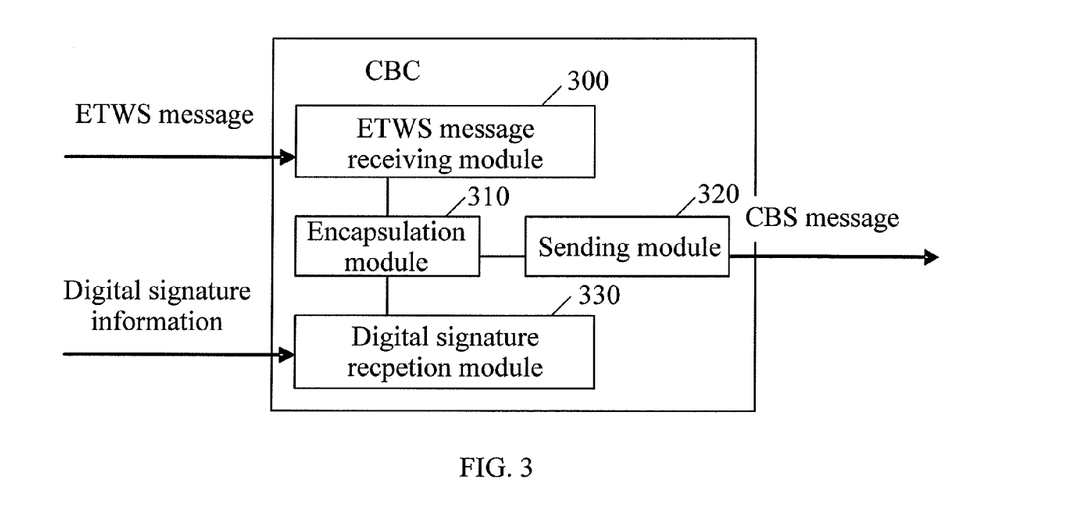
FIG. 3 is a schematic diagram illustrating a CBC in an embodiment of the present invention.

FIG. 3 illustrates a network device that is set to be the CBC in an embodiment of the present invention.

The network device shown in FIG. 3 includes an ETWS message receiving module 300, an encapsulation module 310 and a sending module 320. The network device may further include an optional digital signature receiving module 330.

The ETWS message receiving module 300 receives an ETWS message, for example, an ETWS message published by the GEC.

The digital signature receiving module 330 receives digital signature information, for example, digital signature information published by the GEC. The digital signature information may be the digital signature information of the application layer or the access layer.

The encapsulation module 310 may encapsulate the ETWS message received by the ETWS message receiving module 300 into a CBS message; the encapsulation module 310 may also encapsulate the ETWS message received by the ETWS message receiving module 300 and the digital signature information of application layer received by the digital signature reception module 330 together into a same CBS message. The encapsulation module 310 may also encapsulate the ETWS message received by the ETWS message receiving module 300 into a CBS message, and encapsulate the digital signature information of the application layer received by the digital signature reception module 330 into another CBS message or any message other than the CBS message.

The sending module 320 sends the message encapsulated by the encapsulation module 310 to the RAN. For example, the sending module 320 sends the CBS message having both the ETWS message and the digital signature information to the RAN via the MME. The sending module 320 may also transmit the digital signature information received by the digital signature reception module 330 to the MME transparently.

The CBS shown in FIG. 3 may be located in a LTE system or any other systems such as a WCDMA system.

Figure 4:
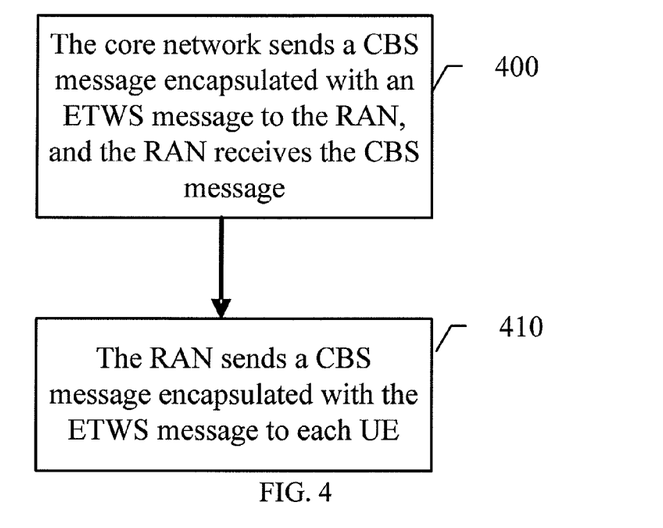
FIG. 4 is a second flowchart of a method for broadcasting and transmitting an ETWS message in an embodiment of the present invention.

The following describes another embodiment of the method for broadcasting and transmitting an ETWS message with reference to FIG. 4.

Step 400: The RAN in the LTE system receives a CBS message containing an ETWS message from the core network. That is, the core network encapsulates the ETWS message into the CBS message, and sends the CBS message containing the ETWS message to the RAN. Then, the process proceeds to step 410.

In step 400, the RAN may receive the CBS message from the core network via S1 interface. That is, the CBS message may be transmitted between the RAN and the core network via the S1 interface. The RAN and the core network may extend the S1 interface, so that the CBS message containing an ETWS message can be transmitted via the extended S1 interface.

The ETWS message in step 400 may be published by an ETWS message publication entity, for example, a GEC. Certainly, the ETWS message publication entity may also be any other device. To avoid unnecessary panics brought about by an ETWS message, the ETWS message publication entity should be a reliable network entity.

The ETWS message publication entity, for example, the GEC, may send an ETWS message to the CBC. The CBC encapsulates the received ETWS message into a CBS message, and then sends the CBS message containing the ETWS message to the RAN via an MME. Of course, the CBC may also send the CBS message containing the ETWS message to the RAN directly. That is, the CBC may send the CBS message containing an ETWS message to the RAN directly via the S1 interface or via the MME.

In addition, in step 400, the core network may send digital signature information to the RAN. The digital signature information may be the digital signature information of access layer, indicating that the security of the ETWS message may be guaranteed by the access layer, or be the digital signature information of application layer, indicating that the security of the ETWS message may be guaranteed by the application layer. The core network may also encapsulate the digital signature information into a CBS message, and then send the CBS message to the RAN. The digital signature information and the ETWS message may be encapsulated into the same CBS message, which is sent to the RAN. The digital signature information and the ETWS message may also be encapsulated into different CBS messages, which are sent to the RAN respectively. Furthermore, the digital signature information may also be transmitted through a message other than the CBS message.

The network entity for publishing the digital signature information may be the GEC or any other network device. If the digital signature information and the ETWS message are not transmitted to the RAN via the same CBS message, the GEC may send the digital signature information to the MME and then the MME sends the digital signature information to the RAN. Certainly, the GEC may also send the digital signature information to the RAN via other transmission paths. For example, the GEC sends the digital signature information to the CBC first; the CBC then sends the digital signature information to the MME; and finally the MME sends the digital signature information to the RAN.

The network entity for receiving the CBS message in the RAN may be a base station (eNB). The network entity for receiving the digital signature information in the RAN may also be an eNB.

It should be noted that the security of the CBS message transmission may be guaranteed by the CBS. Thus, in embodiments of the present invention, the security of CBS message transmission can be guaranteed by using the security of the CBS instead of the digital signature information. In this case, the core network may not send the digital signature information to the RAN. Certainly, the security of the CBS message may also be guaranteed by using the digital signature information or a combination of the security of the CBS and the digital signature information. In this case, the core network sends the digital signature information to the RAN.

Step 410: The RAN receives the CBS message containing an ETWS message from the core network, and sends the CBS message to each UE through system information or via a traffic channel.

In step 410, the RAN may notify each UE to receive the CBS message with the ETWS message. Upon the notification, the RAN sends the CBS message to each UE in the form of system information or via a traffic channel.

The RAN may notify each UE to receive the CBS message containing an ETWS message by the following means: the RAN notifies a UE in idle mode to receive the CBS message containing an ETWS message by a paging notification; or the RAN notifies a UE in connection mode to receive the CBS message encapsulated with an ETWS message via a physical downlink control channel (PDCCH). For example, the RAN notifies a UE to receive the CBS message containing an ETWS message by using a special notification (for example, ETWS-RNTI) via the PDCCH. The means that the RAN informs a UE to receive the CBS message containing an ETWS message may be determined according to practical network conditions are not limited by embodiments of the present invention.

RAN may send a CBS containing an ETWS message to a UE by multiplexing the CBS message into one or multiple system information blocks. Or the RAN may send the CBS message to a UE via a common traffic channel special for carrying a CBS message with an ETWS message. Furthermore, the RAN may also send the CBS message to a UE via a dedicated traffic channel. If the RAN sends the CBS message via a common traffic channel, the RAN can send the CBS message to multiple UEs. While if the RAN sends a CBS message via a dedicated traffic channel (DCH), only one UE may receive the CBS message by one DCH. The dedicated traffic channel may be any existing channel specially used for transmitting a service, and is not limited in embodiments of the present invention. The RAN may map a common traffic channel special for carrying a CBS message containing an ETWS message to a downlink shared channel (DL-SCH) so as to transmit the CBS message encapsulated with the ETWS message. Thus, the RAN may send a CBS message containing an ETWS message to a UE via a common traffic channel special for the ETWS message. If the RAN sends a CBS message containing an ETWS message to a UE in one-to-one mode via a dedicated traffic channel, it makes a UE which is incapable of receiving system information or CBS message in the common traffic channel can receive a CBS message with an encapsulated ETWS message via the dedicated traffic channel.

The RAN may send a CBS message containing an ETWS message to all UEs by any one or any combination of means of multiplexing the CBS message, via a common traffic channel and a dedicated traffic channel. For example, the RAN may send the CBS message including an ETWS message to some UEs by multiplex mode, sends a CBS message containing an ETWS message to some other UEs via a common traffic channel; and the RAN sends a CBS message containing an ETWS message to the rest of UEs via dedicated traffic channels.

If the RAN multiplexes a CBS message with an ETWS message into one or more system information blocks, the RAN may first divide the CBS message into multiple message blocks, and then multiplex multiple message blocks into the one or multiple system information blocks and sent to a UE.

If, in step 410, the core network encapsulates both the ETWS message and digital signature information of application layer into the same CBS message, the CBS message that the RAN sends to a UE includes the ETWS message and the digital signature information. Thus, the UE can obtain both the ETWS message and the digital signature information from the CBS message. If the core network does not encapsulate the ETWS message and digital signature information into the same CBS message, the RAN may send the CBS message with the ETWS message to the UE along with the digital signature information. For example, during the multiplexing process, the RAN may multiplex the CBS message and the digital signature information as a packet into one or multiple system information blocks. It should be noted that if the core network does not encapsulate the ETWS message and digital signature information into the same CBS message, the RAN may receive two messages, where one carries the ETWS message and the other carries the digital signature information. Both messages may be CBS messages (one is encapsulated with the ETWS message and the other is encapsulated with the digital signature information). Or, one of the two message is a CBS message (containing the ETWS message) and the other is a message other than the CBS message (carrying the digital signature information).

Figure 5:
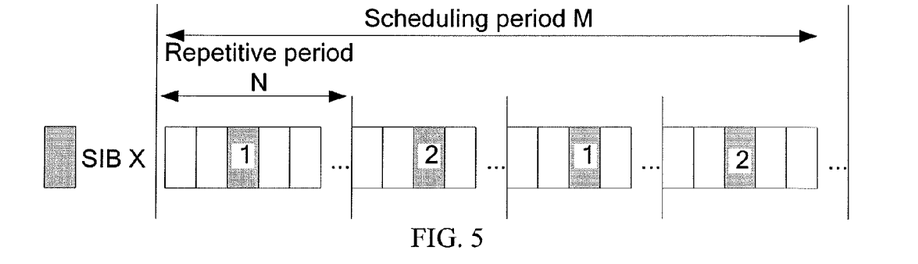
FIG. 5 is a schematic diagram illustrating the multiplexing of a CBS message containing an ETWS message being multiplexed in multiple system information blocks in an embodiment of the present invention.

FIG. 5 illustrates the multiplexing of a CBS message containing an ETWS message into multiple system information blocks.

In FIG. 5, if the scheduling period of a system information block SIB X that carries the CBS message is set to M and the repetition period is set to N, the number of repetitions of the SIB X in the scheduling period is equal to M/N. If the size of an SN, i.e., the ETWS message encapsulated within the CBS message, sent to the UE is set to R and the size of the SIB X message is set to S, and R is greater than S, then the SN message may be divided into blocks and multiplexed for transmission. In FIG. 5, the number of SIB X repetitions in the scheduling period is 4 and the SN message is divided into two blocks, where one is ETWS SN1 (the gray grid with the ID 1 in FIG. 5) and the other is ETWS SN2 (the gray grid with the ID 2 in FIG. 5). The RAN needs to send the ETWS SN1 and the ETWS SN2 periodically. In this case, the actual number of repetitions is 2.

Figure 6:
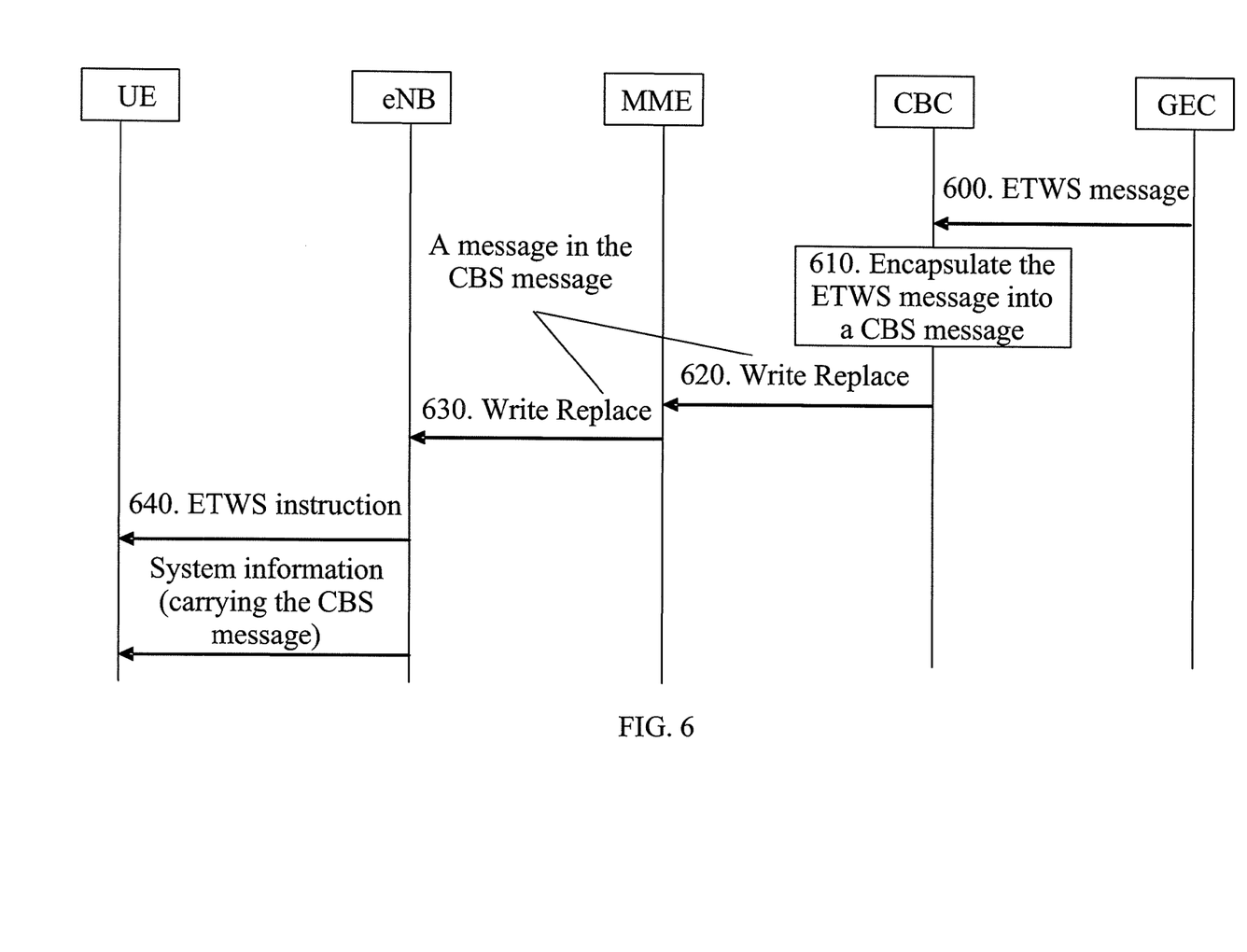
FIG. 6 is a third flowchart of a method for broadcasting and transmitting an ETWS message in an embodiment of the present invention.

The following describes an embodiment of the method for broadcasting and transmitting an ETWS message with reference to FIG. 6.

Step 600: The GEC sends an ETWS message to the CBC. Then, the process proceeds to step 610.

Step 610: The CBC receives the ETWS message from the GEC, and encapsulates the ETWS message into a CBS message. Then, the process proceeds to step 620.

Step 620: The CBC sends the CBS message to the MME via a Service Area Broadcast Protocol (SABP), which is an interface protocol for sending a CBS message at the network side. For example, the CBC encapsulates the ETWS message into a Write Replace message (a message of a type of CBS message), and sends the encapsulated Write Replace message to the MME. Then, the process proceeds to step 630.

Step 630: The MME receives the SABP-based Write Replace message from the CBC, and converts the Write Replace message into an S1-AP-based Write Replace message. Then, the MME delivers the converted Write Replace message to the eNB in the ETWS broadcast area via the S1 interface. Then, the process proceeds to step 640.

Step 640: After receiving the Write Replace message via the S1 interface, the eNB sends an ETWS instruction to each UE according to the broadcast area specified by the Write Replace message. That is, the eNB sends a notification to each UE, notifying the each UE to receive the CBS message containing an ETWS message. The sending a notification by the eNB can be referred to the corresponding description in the preceding embodiments. After sending the ETWS instruction, the eNB sends the CBS message containing an ETWS message to the UE via air interface or in the form of system information. The eNB may send the CBS message in multiplex mode. In step 640, the eNB may also send the CBS message via a common traffic channel or a dedicated traffic channel, as depicted in the preceding embodiments.

Figure 7:
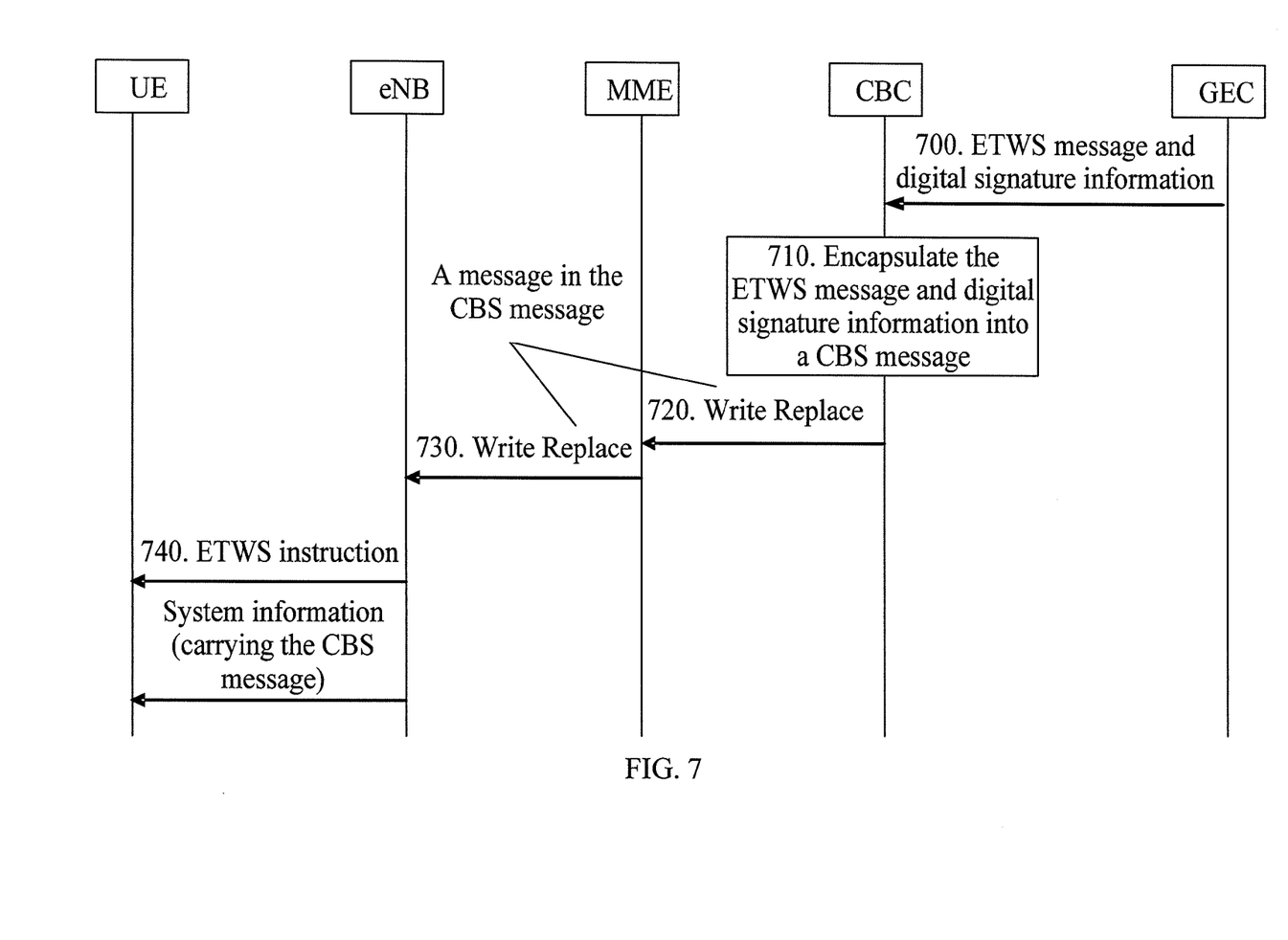
FIG. 7 is a fourth flowchart of a method for broadcasting and transmitting an ETWS message in an embodiment of the present invention.

The following describes an embodiment of the method for broadcasting and transmitting an ETWS message with reference to FIG. 7.

Step 700: A GEC sends an ETWS message and digital signature information to a CBC, the digital signature information is digital signature of application layer. Then, the process proceeds to step 710.

Step 710: The CBC receives the ETWS message and the digital signature information from the GEC, and encapsulates the ETWS message and the digital signature information into a CBS message. Then, the process proceeds to step 720.

Step 720: The CBC sends the CBS message to an MME via an SABP. For example, the CBC encapsulates the ETWS message into a Write Replace message, and sends the Write Replace message to the MME. Then, the process proceeds to step 730.

Step 730: The MME receives the SABP-based Write Replace message from the CBC, and converts the Write Replace message into an S1 application protocol (S1-AP)-based Write Replace message. Then, the MME delivers the converted Write Replace message to an eNB in an ETWS broadcast area via an S1 interface. Then, the process proceeds to step 740.

In step 740: After receiving the Write Replace message via the S1 interface, the eNB sends an ETWS instruction to a UE according to the broadcast area specified by the Write Replace message. That is, the eNB sends a notification to each UE, notifying each UE to receive the CBS message containing an ETWS message. About the process of sending a notification by the eNB, it can be referred to the corresponding descriptions in the preceding embodiments. After sending the ETWS instruction, the eNB sends the CBS message within which both the ETWS message and the digital signature information is encapsulated to the UE via an air interface by using system information. The eNB may also send the CBS message by multiplex mode, as described in preceding embodiments. Of course, in step 740, the eNB may also send the CBS message via a common traffic channel or a dedicated traffic channel, as detailed in the preceding embodiments.

Figure 8:
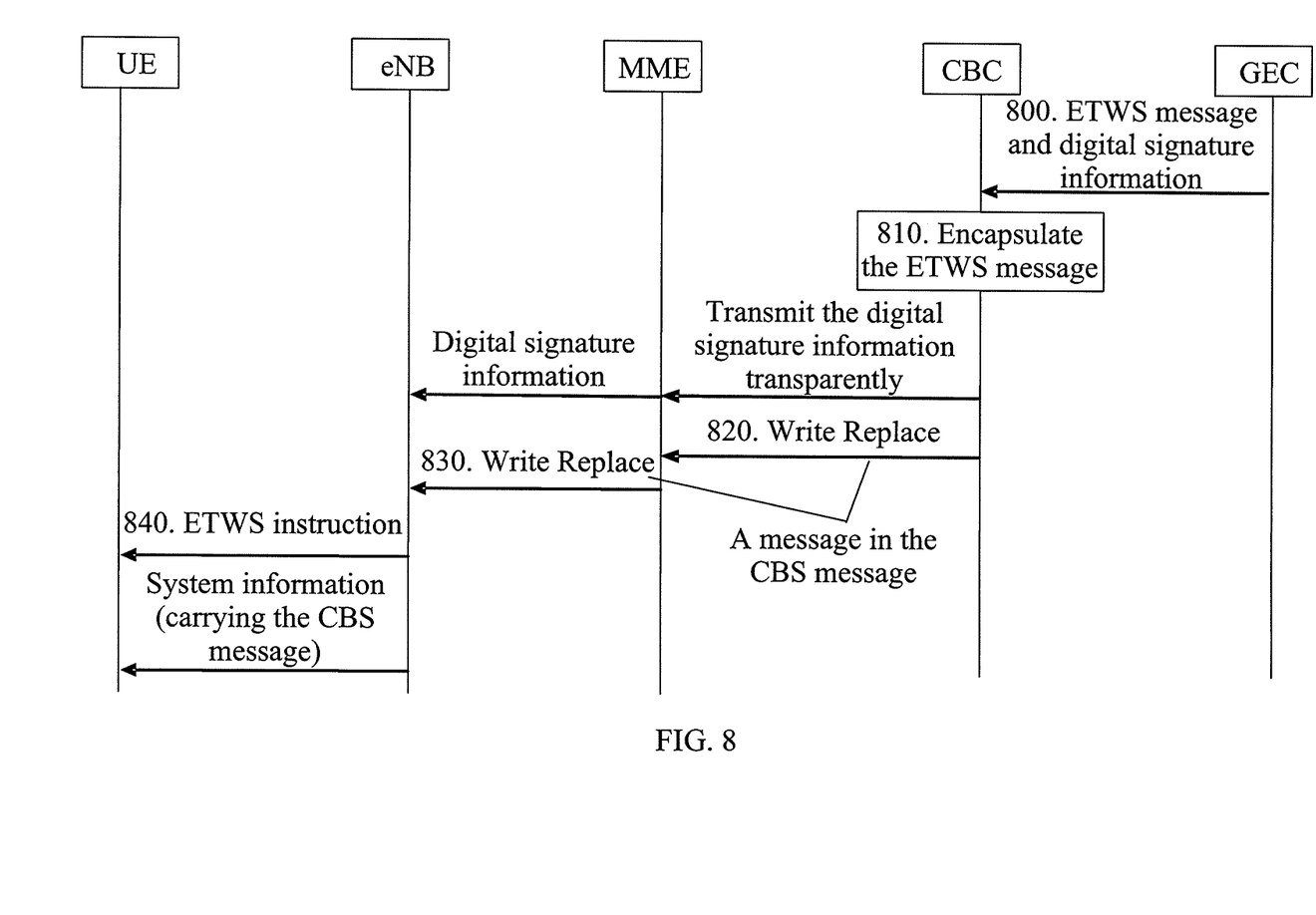
FIG. 8 is a fifth flowchart of a method for broadcasting and transmitting an ETWS message in an embodiment of the present invention.

The following describes an embodiment of the method for broadcasting and transmitting an ETWS message with reference to FIG. 8.

Step 800: A GEC sends an ETWS message and digital signature information of access layer to the CBC. Then, the process proceeds to step 810.

Step 810: The CBC receives the ETWS message and the digital signature information from the GEC, transmits the access layer digital signature information to an MME transparently, and encapsulates the ETWS message into a CBS message. Then, the process proceeds to step 820.

Step 820: The CBC sends the CBS message to the MME via an SABP. For example, the CBC encapsulates the ETWS message into a Write Replace message, and sends the Write Replace message to the MME. Then, the process proceeds to step 830.

Step 830: The MME receives the SABP-based Write Replace message and the digital signature information from the CBC, and converts the Write Replace message and digital signature information into an S1-AP-based Write Replace message. Then, the MME distributes the converted Write Replace message to the eNB in the ETWS broadcast area via the S1 interface. Then, the process proceeds to step 840.

Step 840: After receiving the Write Replace message via the S1 interface, the eNB sends an ETWS instruction to each UE according to the broadcast area in the Write Replace message. That is, the eNB sends a notification to the UE, notifying the UE to receive the CBS message containing the ETWS message. About the eNB sending the notification, it can be referred the description as described in the preceding embodiments. After sending the ETWS instruction, the eNB sends the ETWS message and the digital signature information to each UE via the air interface via system information. The eNB may send the CBS message and the digital signature information by multiplex mode, as described in preceding embodiments. Of course, in step 840, the eNB may also send the CBS message and the digital signature information via a common traffic channel or a dedicated traffic channel, as detailed in the preceding embodiments.

According to the description of the embodiment above, a new technical solution for transmitting an ETWS message is provided by the embodiment. In the embodiment, the ETWS message is encapsulated into a CBS message for transmission, by which the security of the ETWS message transmission may be guaranteed by using the security mechanism of the CBS. Furthermore, the existing S1 interface in the LTE system is extended to transmit the CBS message containing an ETWS message. Therefore, the S1 interface in the LTE system may be reused, which avoids adding a new interface for transmitting the ETWS message. Thus, the ETWS message can be transmitted in LTE while only few changes to the present LTE system protocol are needed. In this embodiment, the security of the ETWS message is further guaranteed by using the digital signature information, which avoids unnecessary social panics brought about by false warning messages.

In embodiments of the present invention, by a paging notification or PDCCH-based notification the UE in different states can accurately receive a CBS message having an ETWS message encapsulated within it. In the embodiments, the CBS message encapsulated with an ETWS message may be sent to a UE by multiplexing the CBS message into system information blocks, or may be sent via a special common traffic channel or a dedicated traffic channel to the UE, so that all UEs which supporting different functions can receive the CBS message encapsulated with an ETWS message. The CBS message encapsulated with an ETWS message is sent by being multiplexed into one or multiple system information blocks, which can avoid the impact on the scheduling of system information due to a large SN message.

Figure 9:
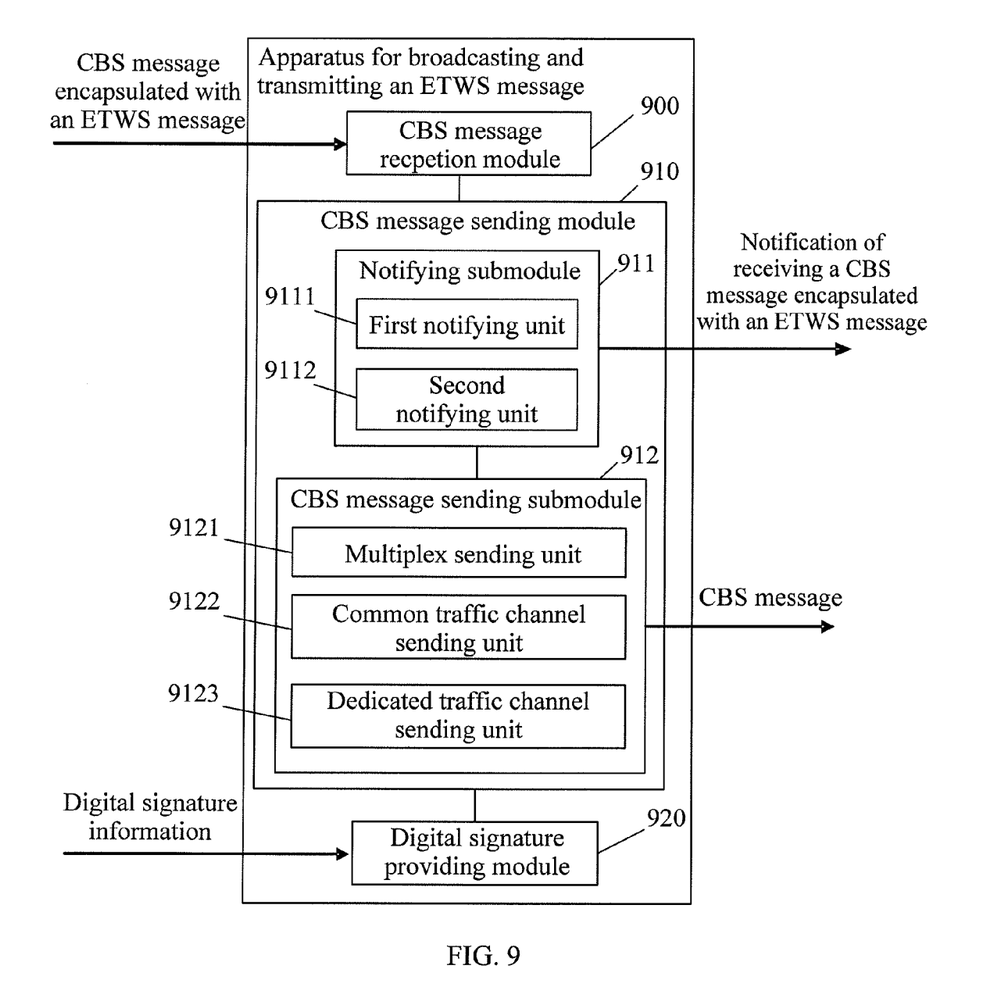
FIG. 9 is a schematic diagram illustrating an apparatus for broadcasting and transmitting an ETWS message in an embodiment of the present invention.

The following describes an apparatus for broadcasting and transmitting an ETWS message in an embodiment of the present invention with reference to FIG. 9.

The apparatus for broadcasting and transmitting an ETWS message in FIG. 9 may be located in the RAN of a LTE system. The apparatus includes a CBS message reception module 900 and a CBS message sending module 910. The apparatus may further include an optional digital signature provision module 920.

The CBS message reception module 900 receives a CBS message within which an ETWS message is encapsulated from a core network. For example, the CBS message reception module 900 receives the CBS message containing the ETWS message from an MME via an S1 interface between the MME and the RAN.

The CBS message sending module 910 sends the CBS message received by the CBS message reception module 900 to a UE.

The digital signature provision module 920 outputs digital signature information provided by the core network to the CBS message sending module 910. For example, if a GEC sends access layer digital signature to the RAN via the MME, the digital signature providing module 920 provides the received access layer digital signature information for the CBS message sending module 910. In another example, if the CBC sends the digital signature information and the CBS message containing the ETWS message to the RAN respectively, the digital signature providing module 920 provides the received access layer digital signature information for the CBS message sending module 910.

If the apparatus includes the digital signature providing module 920 and the digital signature providing module 920 provides the digital signature information for the CBS message sending module 910, the CBS message sending module 910 may receive the digital signature information outputted by the digital signature providing module 920. In this case, the CBS message sending module 910 sends the received digital signature information and the CBS message to the UE to trigger the UE to authenticate the security of the received ETWS message encapsulated within the CBS message according to the digital signature information.

The CBS message sending module 910 includes a notification sub-module 911 and a CBS message sending sub-module 912.

The notification sub-module 911 notifies a UE to receive the CBS message containing an ETWS message.

The CBS message sending sub-module 912 sends the CBS message received by the CBS message reception module 900 to the UE through system information, or via a common traffic channel special for carrying the CBS message or a dedicated traffic channel. It should be noted that if the apparatus includes the digital signature providing module 920, the CBS message sending sub-module 912 needs to send both the received digital signature information and the CBS message together to the UE through the system information, or via a common traffic channel special for carrying the CBS message or a dedicated traffic channel.

The notifying sub-module 911 includes one or two of a first notifying unit 9111 and a second notifying unit 9112. The CBS message sending sub-module 912 includes one or more of the following: a multiplex sending unit 9121, a common traffic channel sending unit 9122 and a dedicated traffic channel sending unit 9123.

The first notifying unit 9111 notifies, via a paging notification, a UE in an idle mode to receive a CBS message containing an ETWS message.

The second notifying unit 9112 notifies a UE in a connection mode to receive a CBS message containing an ETWS message via the PDCCH.

After sending the notification to receive the CBS message to a UE, the multiplex sending unit 9121 multiplexes the CBS message received by the CBS message reception module 900 into one or multiple system information blocks and sends the one or more system information blocks to the UE if the RAN sends the CBS message using multiplex mode. If the apparatus includes the digital signature providing module 920 and the digital signature providing module 920 provides the digital signature information for the CBS message sending module 910, the multiplex sending unit 9121 multiplexes the CBS message received by the CBS message reception module 900 and the digital signature information provided by the digital signature providing module 920 as a packet into one or multiple system information blocks, as detailed in the preceding embodiments.

After sending the notification to a UE, the common traffic channel sending unit 9122 sends the CBS message received by the CBS message reception module 900 to the UE via a common traffic channel special for carrying an ETWS message if the RAN wants to send the CBS message via a common traffic channel, where the common traffic channel may be mapped to the DL-SCH to send the CBS message. If the apparatus includes the digital signature providing module 920 and the digital signature providing module 920 provides digital signature information for the CBS message sending module 910, the common traffic channel sending unit 9122 sends the CBS message received by the CBS message reception module 900 and the digital signature information provided by the digital signature providing module 920 to the UE via a common traffic channel special for carrying an ETWS message, as detailed in the preceding embodiments.

After sending the notification to a UE, the dedicated traffic channel sending unit 9123 sends the CBS message received by the CBS message reception module 900 to the UE via a dedicated traffic channel if the RAN sends the CBS message via a dedicated traffic channel. If the apparatus includes the digital signature providing module 920 and the digital signature providing module 920 provides digital signature information for the CBS message sending module 910, the dedicated traffic channel sending unit 9123 sends the CBS message received by the CBS message reception module 900 and the digital signature information provided by the digital signature providing module 920 to the UE via a dedicated traffic channel, as detailed in the preceding embodiments.

According to the description of the preceding embodiment, the RAN can send a CBS message containing an ETWS message to a UE successively. The UE can receive system information, or a message in a common traffic channel or in a dedicated traffic channel according to the notification from the RAN. Thus, the UE can obtain a CBS message containing the ETWS message, or a CBS message containing both the ETWS message and digital signature information, or a CBS message containing the ETWS message and the digital signature information.

After receiving a CBS message containing an ETWS message, the UE decapsulates the CBS message to obtain the ETWS message encapsulated in the CBS message or both the ETWS message and digital signature information encapsulated in the CBS message.

If the digital signature information obtained by a UE is the digital signature information of access layer, the RRC layer of the UE authenticates the security of the ETWS message encapsulated in the CBS message by using the digital signature information. If the security authentication succeeds, the RRC layer allows the CBS message to be sent to an upper layer (for example, the RRC layer allows the CBS message to be sent to a CBS application layer). Then the CBS application layer may decapsulate the CBS message to obtain the ETWS message, and send the ETWS message to the ETWS application layer. If the security authentication fails, the RRC layer forbids the CBS message to be sent to the upper layer. That is, if the digital signature information is the digital signature information of access layer, the security authentication should be performed before the CBS message is decapsulated.

If the digital signature information received by a UE is the digital signature information of CBS application layer, the CBS application layer of the UE authenticates the security of the ETWS message by using the digital signature information. If the security authentication succeeds, the CBS application layer allows the ETWS message to be sent to an upper layer (for example, the CBS application layer allows the decapsulated ETWS message to be sent to the ETWS application layer). If the security authentication fails, the CBS application layer forbids the decapsulated ETWS message to be sent to an upper layer. It should be noted that if the digital signature information is the digital signature information of the CBS application layer and the digital signature information and the ETWS message are together encapsulated into a same CBS message, the CBS message should be decapsulated before the security authentication; If the digital signature information is the digital signature information of the CBS application layer, and the digital signature information and the ETWS message are not encapsulated into the same CBS message, the security authentication may be performed before the CBS message is decapsulated.

Figure 10:
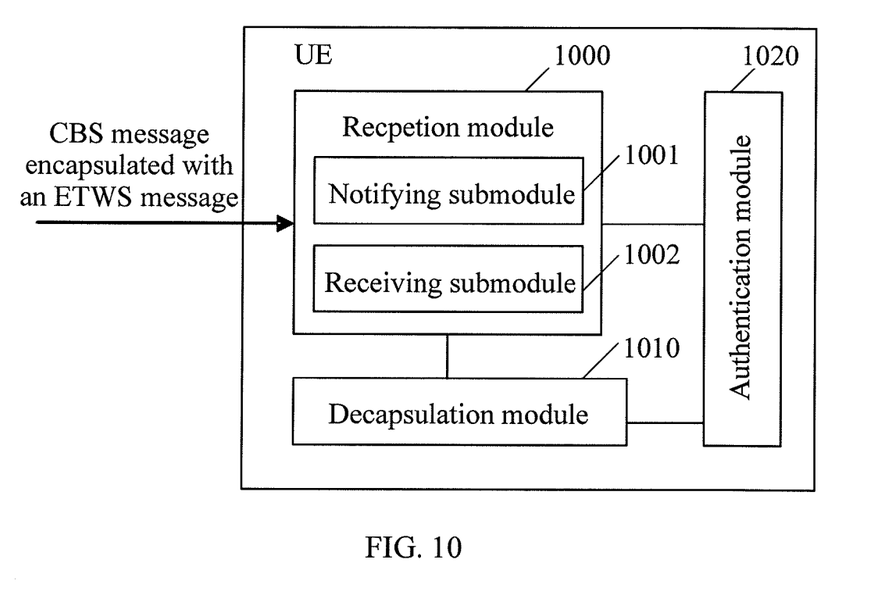
FIG. 10 is a schematic diagram illustrating a UE in an embodiment of the present invention.

The following describes a UE in an embodiment of the present invention with reference to FIG. 10.

The UE shown in FIG. 10 includes a reception module 1000 and a decapsulation module 1010. The UE may further include an optional authentication module 1020.

The reception module 1000 receives a CBS message including an ETWS message, or a CBS message containing both the ETWS message and digital signature information, or, receives a CBS message containing an ETWS message, and digital signature information from the RAN.

The decapsulation module 1010 decapsulates the CBS message received at the reception module 1000, and obtains the ETWS message encapsulated in the CBS message.

The authentication module 1020 authenticates the security of the ETWS message encapsulated in the CBS message according to the digital signature information received at the reception module 1000 receives from the RAN.

It should be noted that if the digital signature information and the ETWS message are not encapsulated into the same CBS message, the decapsulating module 1010 may decapsulate the CBS message after the authentication module 1020 authenticates the security of the ETWS message; If the digital signature information and the ETWS message are encapsulated into the same CBS message, the decapsulating module 1010 may decapsulate the CBS message before the authentication module 1020 authenticates the security of the ETWS message. For example, if the digital signature information received at the reception module 1000 is the digital signature information of access layer, the authentication module 1020 authenticates the security of the ETWS message encapsulated in the CBS message by using the digital signature information of the access layer. If the security authentication succeeds, the authentication module 1020 allows the reception module 1000 to send the received CBS message to an upper layer. Then, the decapsulation module 1010 decapsulates the CBS message to obtain the ETWS message, and sends the ETWS message to the ETWS application layer. If the security authentication fails, the authentication module 1020 forbids the reception module 1000 to send the received CBS message to an upper layer. For another example, if the CBS message received by the reception module 1000 includes the ETWS message and the digital signature information, the decapsulation module 1010 decapsulates the CBS message to obtain the digital signature information and the ETWS message, and the authentication module 1020 authenticates the security of the ETWS message by using the digital signature information. If the security authentication succeeds, the authentication module 1020 allows the decapsulation module 1010 to send the ETWS message to the upper layer (for example, the ETWS application layer); if the security authentication fails, the authentication module 1020 forbids the encapsulation module 1010 to send the ETWS message to the upper layer.

The reception module 1000 includes a notification sub-module 1001 and a receiving sub-module 1002.

The notification sub-module 1001 receives a notification sent by a RAN via a paging notification or a PDCCH. The notification indicates the UE to receive the CBS message containing an ETWS message.

According to the notification received by the sub-module notification sub-module 1001, the receiving sub-module 1002 receives a message sent by the RAN through system information, or via a common traffic channel special for carrying a CBS message or a dedicated traffic channel. The received message may be a CBS message containing an ETWS message. The received message may also be a CBS message containing both an ETWS message and the digital signature information. Or, the message may also include the CBS message containing the ETWS message and the digital signature information, as detailed in the preceding embodiments.

The UE shown in FIG. 10 may be a UE supporting LTE system or a UE supporting other systems such as WCDMA system.

According to the description of the preceding embodiment of the UE, the security of the ETWS message transmission is guaranteed by using the security mechanism of the CBS. The security of the ETWS message is further guaranteed by using the digital signature information. Thus, unnecessary social panics brought about by false warning messages are avoided. In embodiments of the present invention, by using the paging notification or PDCCH-based notification, so that UEs in different states can accurately receive a CBS message containing an ETWS message.

Through the foregoing embodiments, it is understandable to those skilled in the art that the embodiments of the present invention may be implemented through software in addition to a necessary hardware platform or through hardware only. However, in most cases, software and a hardware platform are preferred. Based on such understanding, the technical solution of the present invention or contributions to the prior art can be embodied by a software product. The software product may be stored in a storage medium, for example, a read-only memory/random access memory (ROM/RAM), a magnetic disk or a compact disk (CD), and incorporate several instructions to instruct a computer device, for example, a personal computer, a server, or a network device, to execute the method provided by each embodiment of the present invention.

Although the invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method for broadcasting and transmitting an Earthquake and Tsunami Warning Service (ETWS) message, comprising:

receiving, by a radio access network (RAN), a cell broadcasting service (CBS) message containing the ETWS message from a mobility management entity (MME) in a core network;

sending, by the RAN, the received CBS message to at least one user equipment (UE); and sending, by the RAN, digital signature information to the UE to trigger the UE to authenticate security of the ETWS message contained in the CBS message according to the digital signature information, wherein the digital signature information being provided by the core network, wherein the digital signature information is sent to the RAN using one of:

transmitting transparently the digital signature information by a government ETWS center to the MME, and sending the digital signature information by the MME to the RAN, encapsulating the digital signature information into the CBS message containing the ETWS message, and sending the CBS message to the RAN, or encapsulating the digital signature information into another CBS message which is different from the CBS message containing the ETWS message, and sending the another CBS message to the RAN.

2. The method of claim 1, wherein the CBS message containing the ETWS message is sent from a cell broadcast center (CBC) to the MME after the CBC encapsulating the ETWS message into the CBS message, wherein the CBS message is then sent by the MME to the RAN, and wherein the ETWS message is being sent to the CBC by an ETWS message publication entity.

3. The method of claim 1, wherein the sending, by the RAN, the received CBS message to at least one UE comprising:

sending by the RAN, the CBS message to the at least one UE utilizing at least one of:
system information;
a common traffic channel special for carrying any CBS message; and
a dedicated traffic channel.

4. The method of claim 3, wherein sending, by the RAN, the CBS message containing the ETWS message to the at least one UE by system information comprising:

sending by the RAN, the CBS message to the UE by multiplexing the received CBS message into one or more system information blocks.

5. The method of claim 3, further comprising:
notifying, by the RAN, the UE to receive the CBS message containing the ETWS message.

6. The method of claim 5, wherein the notifying by the RAN of the UE to receive the CBS message containing the ETWS message comprising:

notifying, by the RAN, a UE in an idle mode to receive the CBS message by a paging notification; and/or, notifying, by the RAN, a UE in a connection mode to receive the CBS message via a physical downlink control channel (PDCCH).

7. The method of claim 1, wherein the receiving by the RAN, the CBS message containing the ETWS message from the MME in the core network comprising:

receiving by the RAN, the CBS message containing the ETWS message from the core network via an S1 interface, wherein the S1 interface is an extended interface between the RAN and the core network, and the S1 interface is configured for carrying a CBS message containing an ETWS message.

8. An apparatus for broadcasting and transmitting an Earthquake and Tsunami Warning Service (ETWS) message, wherein the apparatus is located in a radio access network, and the apparatus comprises:

a cell broadcast service (CBS) message reception module, configured to receive a CBS message containing the ETWS message sent by a mobility management entity (MME) in a core network;

a CBS message sending module, configured to send the CBS message which was received by the CBS message reception module, to a user equipment (UE); and a digital signature module, configured to receive digital signature information from the core network and output the received digital signature information to the CBS message sending module, wherein the CBS message sending module is further configured to send the digital signature information and the CBS message to the UE to trigger the UE to authenticate security of the ETWS message according to the digital signature information.

9. The apparatus of claim 8, the CBS message sending module further comprises:

a notification sub-module, configured to notify the UE to receive the CBS message containing the ETWS message; and/or a CBS message sending sub-module, configured to send the CBS message received by the CBS message reception module to the UE using one of:
system information, a common traffic channel special for carrying a CBS message, or a dedicated traffic channel.

10. A method for broadcasting and transmitting an Earthquake and Tsunami Warning Service (ETWS) message, comprising:

receiving, by a cell broadcast center (CBC), the ETWS message;

encapsulating, by the CBC, the received ETWS message into a cell broadcast service (CBS) message;

sending, by the CBC, the CBS message containing the ETWS message to a radio access network (RAN);

receiving, by the CBC, digital signature information; and sending, by the CBC, the digital signature information to the RAN, wherein the sending of the digital signature information to the RAN comprising:

sending the digital signature information, by the CBC, to a mobility management entity (MME) transparently, wherein the digital signature information is subsequently sent from the MME to the RAN.

11. The method of claim 10, wherein the sending of the CBS message to the RAN comprising:

transmitting, by the CBC, the CBS message to the RAN via the MME.

12. A method for broadcasting and transmitting an Earthquake and Tsunami Warning Service (ETWS) message, comprising:

receiving, by a cell broadcast center (CBC), the ETWS message;

encapsulating, by the CBC, the received ETWS message into a cell broadcast service (CBS) message;

sending, by the CBC, the CBS message containing the ETWS message to a radio access network (RAN);

receiving, by the CBC, digital signature information;

sending, by the CBC, the digital signature information to the RAN; and encapsulating, by the CBC, the digital signature information into the CBS message before sending the digital signature to the RAN.

13. The method of claim 12, wherein the sending of the CBS message to the RAN comprising:

transmitting, by the CBC, the CBS message to the RAN via a mobility management entity (MME).

14. A network device, comprising:

an Earthquake and Tsunami Warning Service (ETWS) message reception module, configured to receive an ETWS message;

an encapsulation module, configured to encapsulate the ETWS message received by the ETWS message reception module into a cell broadcast service (CBS) message;

a sending module, configured to send the CBS message containing the ETWS message encapsulated by the encapsulation module to a radio access network (RAN); and a digital signature reception module, configured to receive digital signature information, wherein the encapsulation module is further configured to:
encapsulate the digital signature information into the CBS message containing the ETWS message, or encapsulate the digital signature information into another CBS message different from the CBS message containing the ETWS message.

15. A network device, comprising:

an Earthquake and Tsunami Warning Service (ETWS) message reception module, configured to receive an ETWS message;

an encapsulation module, configured to encapsulate the ETWS message received by the ETWS message reception module into a cell broadcast service (CBS) message;

a sending module, configured to send the CBS message containing the ETWS message encapsulated by the encapsulation module to a radio access network (RAN); and a digital signature reception module, configured to receive digital signature information, wherein the sending module is further configured to send the digital signature information to a mobility management entity (MME) transparently in order to subsequently send the digital signature information from the MME to the RAN.

* * * * *